United States Patent [19]

Kato

[11] Patent Number: 5,537,277
[45] Date of Patent: Jul. 16, 1996

[54] MAGNETIC HEAD FOR USE IN CONVERTING A LOW TRACK DENSITY DISK TO A HIGH TRACK DENSITY DISK

[75] Inventor: Minoru Kato, Chichibu, Japan

[73] Assignee: Canon Denshi Kabushiki Kaisha, Saitama, Japan

[21] Appl. No.: 769,857

[22] Filed: Oct. 2, 1991

[30] Foreign Application Priority Data

Oct. 5, 1990 [JP] Japan .................... 2-266473

[51] Int. Cl.⁶ .................................................. G11B 5/29
[52] U.S. Cl. .................................... 360/121; 360/118
[58] Field of Search ........................ 360/55, 118, 121

[56] References Cited

U.S. PATENT DOCUMENTS

| | | | |
|---|---|---|---|
| 3,549,822 | 12/1970 | Chupity | 360/121 |
| 3,668,669 | 6/1972 | Marino et al. | 360/121 |
| 4,079,426 | 3/1978 | Umeda et al. | 360/55 |
| 4,622,601 | 11/1986 | Isozaki et al. | 360/118 |
| 4,750,071 | 6/1988 | Kato et al. | 360/121 |
| 4,774,616 | 9/1988 | Kumasaka et al. | 360/118 |
| 4,805,051 | 2/1989 | De Marco et al. | 360/121 |
| 4,933,795 | 6/1990 | Nigam | 360/121 |

FOREIGN PATENT DOCUMENTS 2-49207   2/1990   Japan .

*Primary Examiner*—Edward P. Westin
*Assistant Examiner*—Benjamin D. Driscoll
*Attorney, Agent, or Firm*—Spencer & Frank

[57] ABSTRACT

A magnetic head for sliding on a recording medium for executing magnetic recording or magnetic reproducing of information includes a magnetic core having a recording/reproducing magnetic gap whose track width is defined narrow in accordance with high-ranking high track density, and an erasing magnetic gap which is disposed upstream of a medium-sliding direction, in such a manner that the erasing magnetic gap is adjacent to the recording/reproducing gap, and whose track width is defined wide in accordance with low-ranking low track density. A center of the recording/reproducing magnetic gap in a direction perpendicular to the track is shifted by a predetermined amount of shift in the direction perpendicular to the track with respect to a center of the erasing magnetic gap in the direction perpendicular to the track.

10 Claims, 9 Drawing Sheets

| CAPACITY (UNFORMAT) | 1MB | 1.6MB | 2MB | 4MB | 12.5MB | 16MB |
|---|---|---|---|---|---|---|
| MAXIMUM LINEAL RECORDING DENSITY (KBPI) | 8.7 | 14.2 | 17.4 | 35.0 | 36.5 | 35.1 |
| TRACK DENSITY (TPI) | 135.0 | 135.0 | 135.0 | 135.0 | 406.0 | 542.0 |
| TRACK PITCH (mm) | 0.1875 | 0.1875 | 0.1875 | 0.1875 | 0.0625 | 0.0469 |
| MEDIUM | Co-YFe₂O₃ | Co-YFe₂O₃ | Co-YFe₂O₃ | Ba FERRITE | METAL | METAL |

| TRACK DENSITY TPI | MAGNIFICATION | TRACK PITCH PH μm | R/W TRACK WIDTH RH μm | RA | | | | | |
|---|---|---|---|---|---|---|---|---|---|
| | | | | PH+RH μm | 2*PH+RH μm | 3*PH+RH μm | 4*PH+RH μm | 5*PH+RH μm | 6*PH+RH μm |
| 135 | x1 | 187.5 | 115.0 | ------ | ------ | ------ | ------ | ------ | ------ |
| 405 | x3 | 62.5 | 50.0 | 112.5 | 175.0 | 237.5 | 300.0 | 362.5 | 425.0 |
| 542 | x4 | 46.9 | 40.0 | 86.9 | 133.8 | 180.6 | 227.5 | 274.4 | 321.3 |
| 677 | x5 | 37.5 | 32.0 | 69.5 | 107.0 | 144.5 | 182.0 | 219.5 | 257.0 |
| 813 | x6 | 31.3 | 24.5 | 55.8 | 87.0 | 118.3 | 149.5 | 180.8 | 212.0 |
| 948 | x7 | 26.8 | 22.0 | 48.8 | 75.6 | 102.4 | 129.1 | 155.9 | 182.7 |
| 1084 | x8 | 23.4 | 19.5 | 42.9 | 66.4 | 89.8 | 113.3 | 136.7 | 160.1 |
| 1219 | x9 | 20.8 | 17.5 | 38.3 | 59.1 | 79.9 | 100.7 | 121.5 | 142.3 |
| 1355 | x10 | 18.8 | 15.5 | 34.3 | 53.0 | 71.8 | 90.5 | 109.3 | 128.0 |
| 1490 | x11 | 17.0 | 14.0 | 31.0 | 48.1 | 65.1 | 82.2 | 99.2 | 116.3 |
| 1626 | x12 | 15.6 | 13.0 | 28.6 | 44.3 | 59.9 | 75.5 | 91.1 | 106.8 |

5,537,277

MAGNETIC HEAD FOR USE IN CONVERTING A LOW TRACK DENSITY DISK TO A HIGH TRACK DENSITY DISK

BACKGROUND OF THE INVENTION

1. Field of the Invention

The present invention relates to a magnetic head, and in particular, to a magnetic head for use in a magnetic disc drive which executes magnetic recording/reproducing of information on/from a magnetic disc serving as a rotating recording medium.

2. Description of the Prior Art

Some conventional structures of such a magnetic head will be described with reference to FIG. 1A to FIG. 3B, for use in a floppy disc driver (to be called "FDD" for short hereinafter) executing recording/reproducing of information on/from a floppy disc, that is, a flexible rotating magnetic recording medium. FIG. 1A to FIG. 3B show respectively constructions of three kinds of magnetic heads different from each other. FIGS. 1A, 2A and 3A are front elevations, respectively showing medium-sliding surface side of magnetic heads, while FIGS. 1B, 2B and 3B are enlarged views of gap sections or parts of cores of the heads, respectively. Parts or sections common to or corresponding to all the figures are designated by the same or like reference numbers.

First, FIGS. 1A and 1B show a conventional example of a magnetic head of so-called tunnel erasing type for use in the in FDD for a disc whose recording capacity is 1–2 MB. In these figures, reference numeral 1 denotes a core assembly constructed as a combination in which a magnetic core 2 (called "a recording/reproducing core" hereinafter) for recording/reproducing, and an erasing magnetic core 4 (called "an erasing core" hereinafter) for erasing both ends of a recording track, that is, for executing so-called tunnel erasing are joined to each other.

The recording/reproducing core 2 has a magnetic gap 3 (called "a recording/reproducing gap" hereinafter) for recording/reproducing. The recording/reproducing gap 3 has a track width RW. Further, the erasing core 4 has a pair of erasing magnetic gaps 5 and 5' (called "erasing gaps" hereinafter) which have their respective track widths E and E'. Both ends of the recording/reproducing track width RW are erased with the erasing track widths E and E', so that information is recorded on the floppy disc in an effective track width RC between the erasing track width E and E'. In this connection, a sliding direction of a disc (not shown) with respect to the magnetic head is indicated by an arrow A shown in FIG. 1A.

A pair of non-magnetic sliders 7 and 8 are joined, by an adhesive or a glass material, respectively to both sides of the core assembly 1 composed of the recording/reproducing core 2 and the erasing core 4, to construct a magnetic head 10. The sliders 7 and 8 are, together with the core assembly 1, in sliding contact with the floppy disc (not shown) at a part of a sliding surface 9. Thus, the sliding contact of the core assembly 1 is stabilized, and the core assembly 1 is protected. Furthermore, each of the sliders 7 and 8 is made of a ceramic material.

Next, FIGS. 2A and 2B show an example of a conventional magnetic head of so-called precedence-erasing type, which is used in an FDD for a disc whose capacity is 4 MB. A difference of a magnetic head 10 from the conventional head shown in FIGS. 1A and 1B is, first, that arrangement of a recording/reproducing core 2 and an erasing core 4 is reversed. That is, the erasing core 4 is arranged upstream (on the side where the medium enters) of the recording/reproducing core 2 along a medium sliding direction indicated by the arrow A, to executed so-called precedence erasing. Moreover, an erasing gap 5 of the erasing core 4 is single and has an erasing track width EA. The erasing track width EA is identical with the sum of the erasing track widths E and E' and the effective track width RC of the example of the conventional type. In this connection, a track width RC of a recording/reproducing gap 3 of the recording/reproducing core 2 is also similar to one in the example of the conventional type shown in FIG. 1B. Further, the recording/reproducing core 2 and the erasing core 4 are joined to each other through a gap plate 6 which prevents magnetic interference between them.

In the magnetic head 10, since data are recorded by the recording/reproducing gap 3 after erasing has been executed by the erasing gap 5, there is no effect or influence of previous recording data when the first-mentioned data are rewritten or overwritten. Thus, it is also possible for a medium having large coercive force Hc to sufficiently overwrite the data.

Next, a magnetic head 10 illustrated in FIGS. 3A and 3B is used in-a further large-capacity type FDD. In the conventional magnetic head shown in FIG. 1A–FIG. 2B, the track density is 135 TPI (track pitch=0.1875 mm), whereas, in the magnetic head shown in FIGS. 3A and 3B, the track density is so improved as to be 405–1000 TPI. Then the track position control is executed by a servo signal with high accuracy. For this reason, as shown in FIG. 3B, the magnetic core becomes only a magnetic/reproducing core 2' having a recording/reproducing gap 3.

Furthermore, in this case, in order to improve the track density and also line recording density, the recording/reproducing gap 3 becomes a narrow gap. Accordingly, it is necessary to improve recording performance. For this reason, a thin film 11 of soft magnetic material with high permeability, made of an alloy of Fe-Al-Si series or the like, is made-up, so as to have a thickness of several μm—several tens μm, on confronting surfaces of the recording/reproducing core 2' made of ferrite, which are confronted with the thin film 11 through the recording/reproducing gap 3, by a thin-film forming technology such as sputtering, vacuum deposition or the like.

In connection with the above, a table in FIG. 4 illustrates various characteristics regarding the recording density of various FDDs for a 3.5 inch floppy disc, on which is mounted the conventional magnetic head described above. By the way, generally, in using FDDs, it is required to keep or maintain interchangeability between high ranking models and low ranking models which are different in recording capacity from each other, in order to retain interchangeability between software and data so as to provide a useful environment when used. For example, in the FDD for the 3.5 inch floppy disc illustrated in FIG. 4, some product whose capacity is 1.6 MB or 2 MB, is capable of writing and reading (hereinafter referred to as "R/W interchange") with respect to a disc of 1M capacity and another product whose capacity is 4 MB, is capable of R/W interchange of disc of 1 MB or 2 MB (1.6 MB) capacity. Since, however, these products which are 135 TPI in the track density of disc are the same, thus enabling R/W interchange. If the track densities are different from each other, the products are capable of reading data from a disc with low track density, but cannot execute writing data on it. That is, the products become a type such that interchange between the software and the data as conventionally performed cannot be carried out sufficiently. For example, since in recent years, capacity of processing software such as integrated software, image information, and data base or the like increases, there is a trend toward higher capacity of the FDD including usages such as backup of a hard disc or the like. Thus, there appear products having capacity on the order of 10 MB–50 MB including the product whose capacity is 12.5 MB or 16 MB as shown in FIG. 4. The track density of each of these FDDs is 405 TPI–1555 TPI which is three times or more than 135 TPI of the track density of the conventional FDDs. For this reason, in the conventional products, the low-ranking R/W interchange cannot be executed.

In view of the above, in order that the interchangeability can be maintained even if the track densities are different from each other, a magnetic head of a complex type has been proposed in which a magnetic core of the tunnel erasing type or the precedence erasing type and a magnetic core of a servo signal type are placed in parallel to each other in a track widthwise direction. An example of the conventional magnetic head is shown in FIG. 5. In this magnetic head 10, a core assembly 1 (for 135 TPI) similar to that shown in FIGS. 1A and 1B, and a recording/reproducing core 2' (for 405 TPI–1555 TPI) of the servo signal type similar to that shown in FIGS. 3A and 3B are placed in parallel to each other with a gap plate or partition 16 made of non-magnetic ferrite, ceramics, glass material or the like located therebetween. When the magnetic head of complex type constructed in this manner is used to execute recording/reproducing on or from a magnetic disc (not shown), the core assembly 1 and the recording/reproducing core 2' are used in suitable selection, depending upon a difference in the track density, whereby the R/W interchange between the high ranking models (10 MB–50 MB) and the low ranking models (1 MB–4 MB) is made possible.

In this magnetic head of complex type, however, there arises a problem of interference due to magnetic flux leakage between the core assembly 1 and the recording/reproducing core 2', that is, a problem of so-called crosstalk. For example, when reproducing is executed by a recording/reproducing gap 3 in the recording/reproducing core 2' of the high-ranking track density, another adjacent recording/reproducing gap 3 in the core assembly 1 of the low-ranking track density executes reproducing on a plurality of high-ranking tracks. For this reason, the magnetic flux flowing through the core assembly 1 becomes magnetic flux leakage so that the magnetic flux leakage flows into the high-ranking recording/reproducing core 2'. By such crosstalk, there arises great problems on formation of an FDD, such as a lack in reliability of data, and the like.

Further, since the core assembly 1 and the recording/reproducing core 2' are arranged adjacent to each other, spaces for a coil bobbin, a back core and the like (not shown) are limited, thus causing difficulty in designing the magnetic head, and an increase in the number of parts. This leads to an increase in the cost for parts, and an increased number of assembly processes, thus resulting in a significant rise in cost for manufacturing the magnetic head.

Furthermore, it is difficult for each of the gaps 3, 5 and 5' in the core assembly 1 as well as the recording/reproducing core 2', which are placed in parallel to each other in the sliding surface 9 with a predetermined distance, to be both in sliding contact with the floppy disc in a stable condition. Thus, there arise problems associated with characteristics such as deterioration in modulation, reduction in reproducing output, or the like.

SUMMARY OF THE INVENTION

In order to solve the above-described problems associated with the prior art, it is an object of this invention to provide a magnetic head for a magnetic-disc driver which has a construction enabling recording and reproducing with respect to track densities different from each other, and which can be produced simply and at low cost, eliminating problems of crosstalk, and deterioration in characteristics.

To meet the above object, a first aspect of the present invention provides a magnetic head sliding on a recording medium for executing magnetic recording or magnetic reproducing of information, the magnetic head comprising:

a magnetic core having a recording/reproducing magnetic gap whose track width is defined narrow in accordance with high-ranking high track density, and an erasing magnetic gap which is disposed upstream of a medium-sliding direction, in such a manner that the erasing magnetic gap is adjacent to the recording/reproducing gap, and whose track width is defined wide in accordance with low-ranking low track density, wherein a center of the recording/reproducing magnetic gap in a direction perpendicular to the track is shifted by a predetermined amount of shift in the direction perpendicular to the track with respect to a center of the erasing magnetic gap in the direction perpendicular to the track.

A second aspect of the present invention provides a magnetic head sliding on a rotating magnetic disc for executing magnetic recording of information and/or magnetic reproducing of information, the magnetic head comprising:

a single core assembly having an upstream erasing gap and a downstream recording/reproducing gap which are arranged in adjacent relation to each other along a disc rotating direction; and a pair of sliders joined to both sides of the single core assembly respectively, wherein the upstream erasing gap has a track width corresponding to low-ranking low track density, and the downstream recording/reproducing gap has a track width corresponding to high-ranking high track density, and wherein the downstream recording/reproducing gap has a center in direction perpendicular to the track, which is so set as to be shifted by a predetermined amount in the direction perpendicular to the track with respect to a center of the upstream erasing gap in the direction perpendicular to the track, the predetermined amount being set at a value integer multiples of ½ of a track pitch of the high track density.

According to the above arrangement of the present invention, when the same data are recorded on the plurality of tracks at high track density, with respect to the disc recorded at the aforesaid low track density, to execute rewriting of the data, due to shift in the position at the aforementioned centers of the gaps enables track, positioning control of the magnetic head can be executed easily. Accordingly, the present invention can provide an excellent magnetic head by which recording and reproducing can easily be executed so as to correspond to track densities different from each other in the manner described above, whose construction is simple. Further, it is possible to provide the magnetic head which is superior in recording/reproducing characteristics with a simplified structure and at reduced cost, eliminating a problem of crosstalk, or the like.

The above and other objects, effects, features and advantages of the present invention will become more apparent from the following description of embodiments thereof taken in conjunction with the accompanying drawings.

BRIEF DESCRIPTION OF THE DRAWINGS

Embodiments of the invention will now be described, by way of example, and with reference to the accompanying drawings in which:

FIG. 4 is a view of a table illustrating recording density-related characteristics of various FDDs for a 3.5 inch floppy disc in a conventional example, which are different in capacity from each other;

FIG. 10 is a view of a table illustrating the relationship among track pitch, track width and a number of tracks in the case where rewriting is made by high-ranking track density with respect to low-racking track density, in accordance with the present invention.

DETAILED DESCRIPTION OF PREFERRED EMBODIMENTS

The invention will now be described with reference to the accompanying drawings.

(First Embodiment)

Figure 1A:
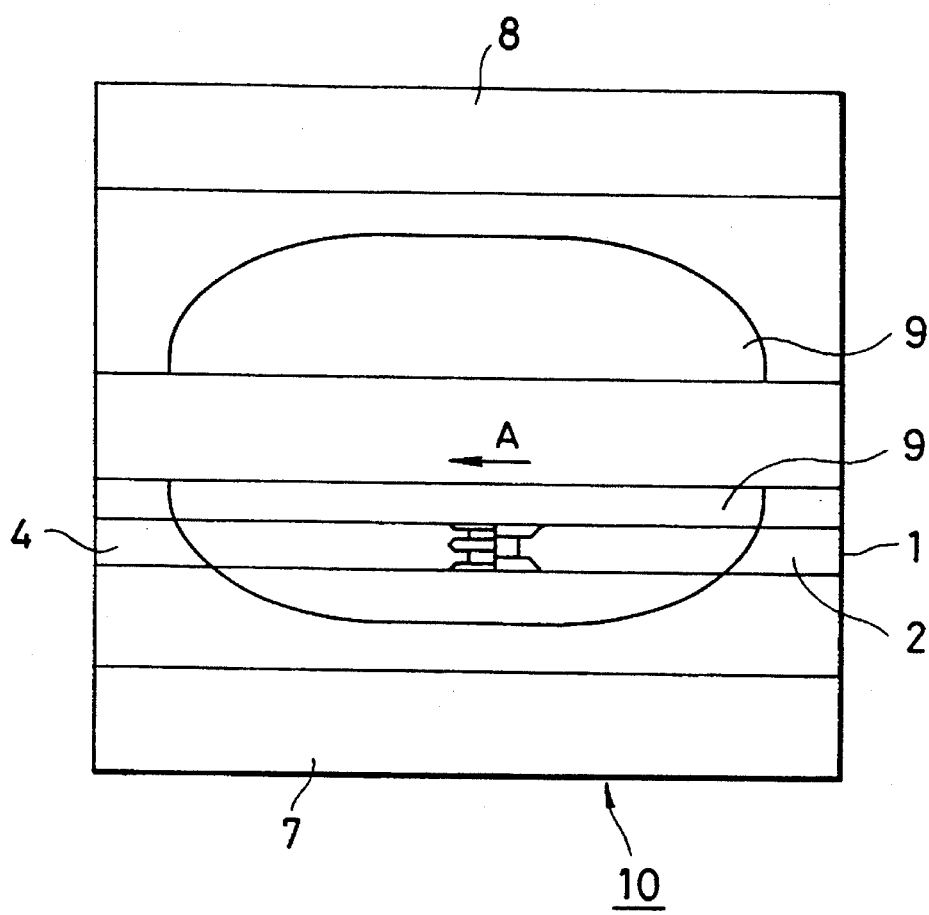
FIG. 1A is a front view showing a construction of a conventional magnetic head.
Figure 1B:
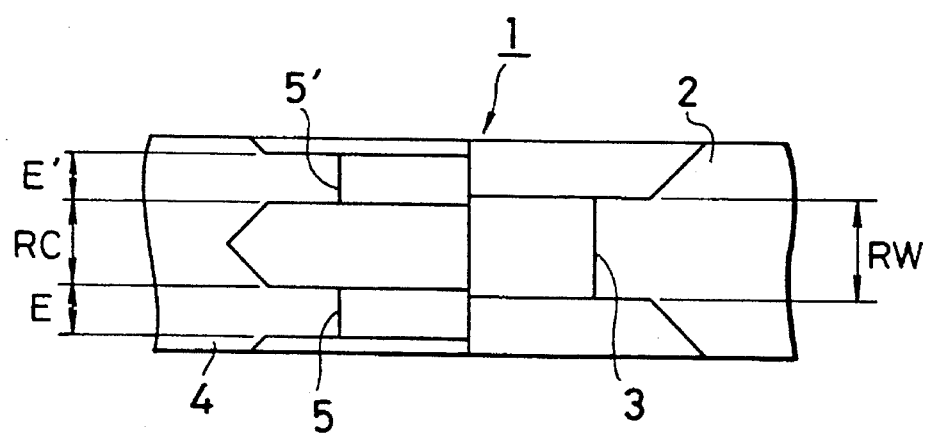
FIG. 1B is an enlarged detail showing gap part in a magnetic core of the magnetic head shown in FIG. 1A.
Figure 2A:
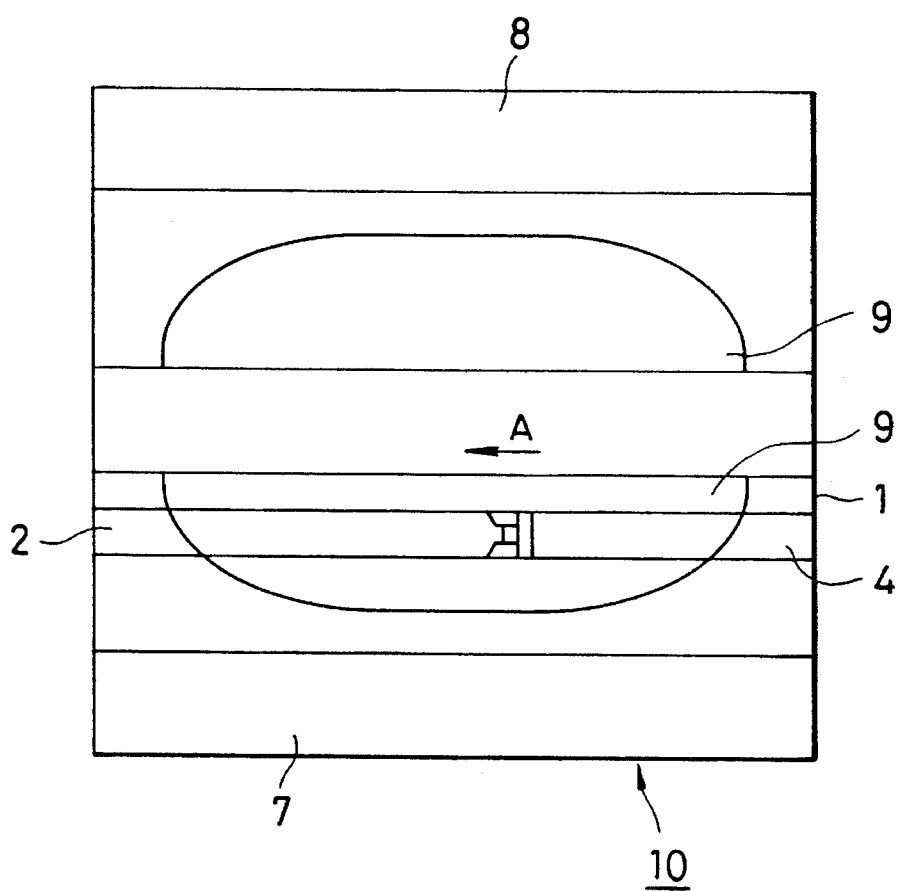
FIG. 2A is a front view showing another conventional magnetic head.
Figure 2B:
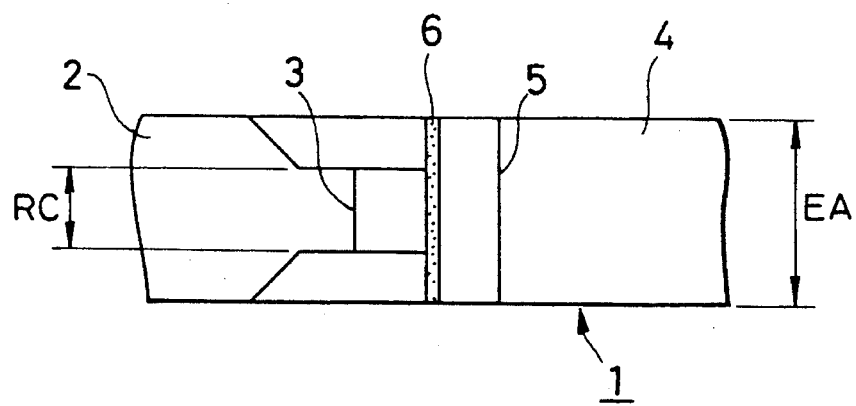
FIG. 2B is an enlarged detail of gap part in a magnetic core of the magnetic head shown in FIG. 2A.
Figure 3A:
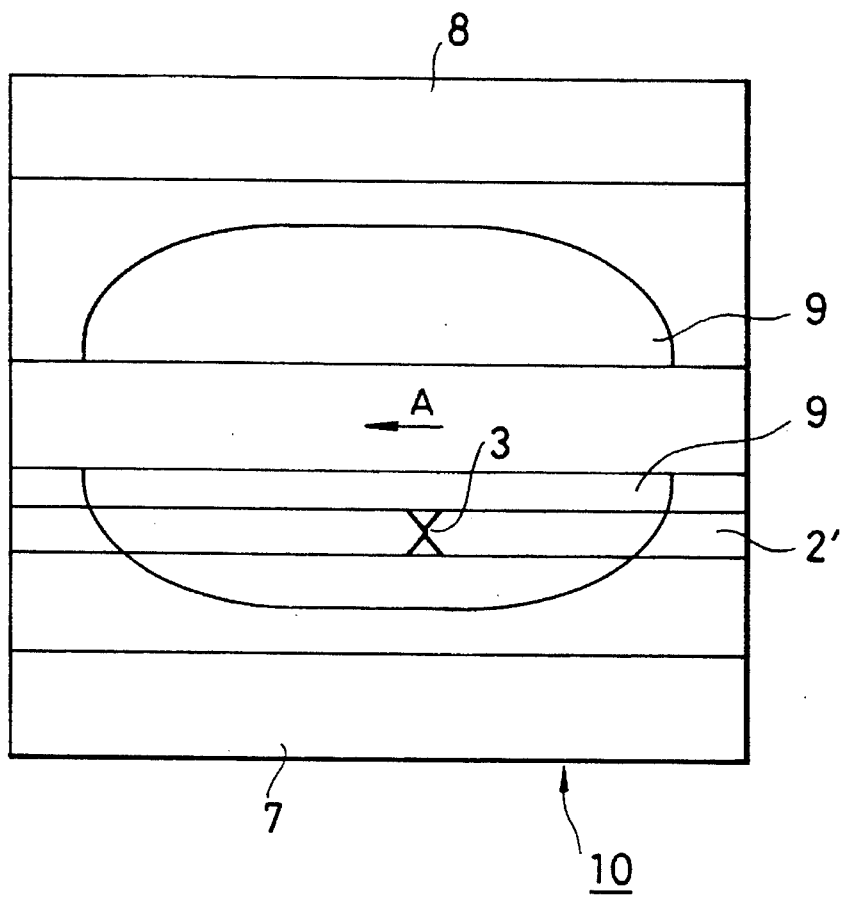
FIG. 3A is a front view showing further different conventional magnetic head.
Figure 3B:
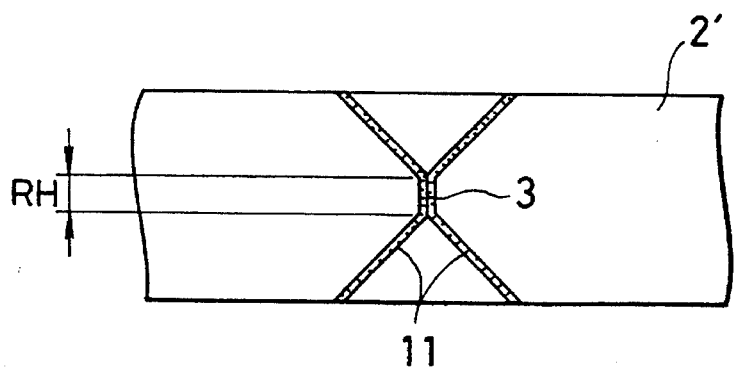
FIG. 3B is an enlarged detail of gap part in a magnetic core of the magnetic head shown in FIG. 3A.
Figure 5:
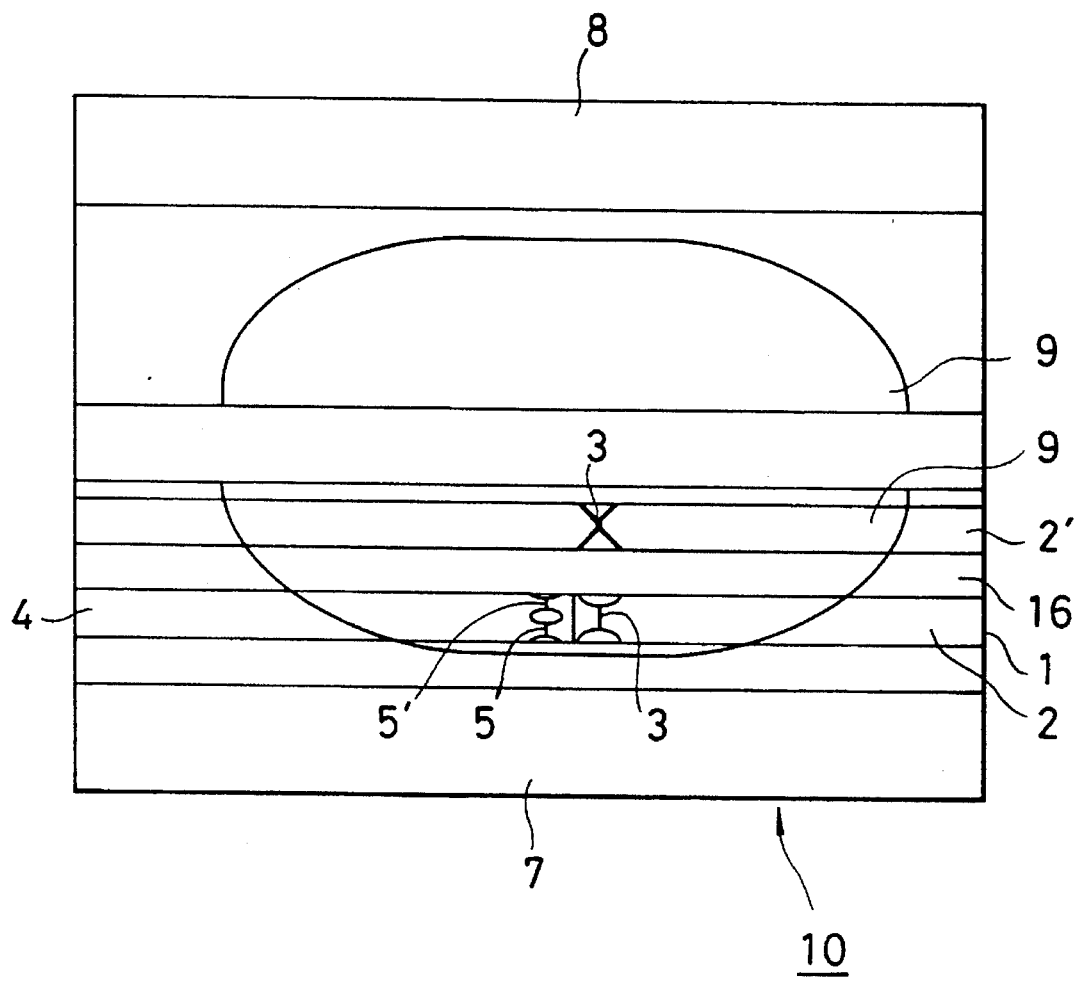
FIG. 5 is a front view showing a conventional magnetic head of complex type.
Figure 6:
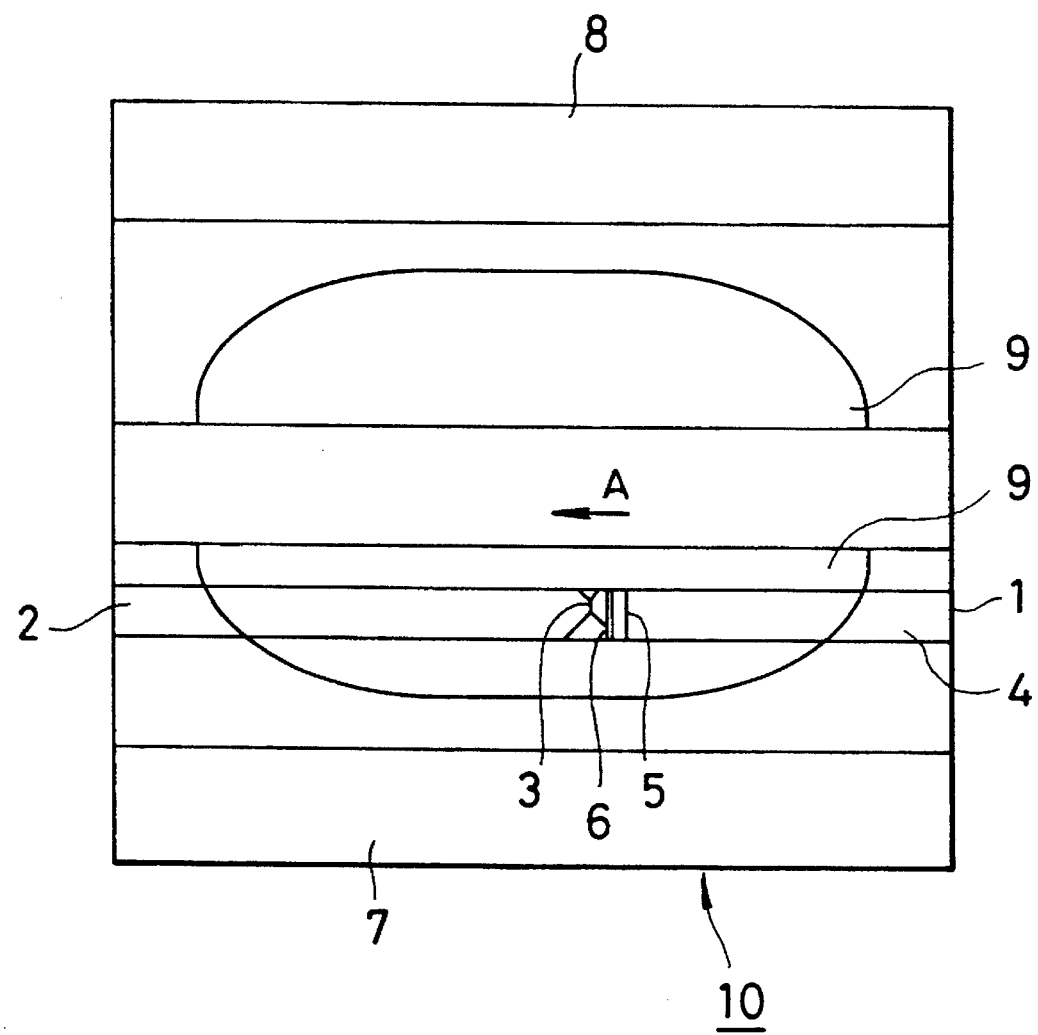
FIG. 6 is a front view showing a construction of an embodiment of a magnetic head in accordance with the present invention.
Figure 7:
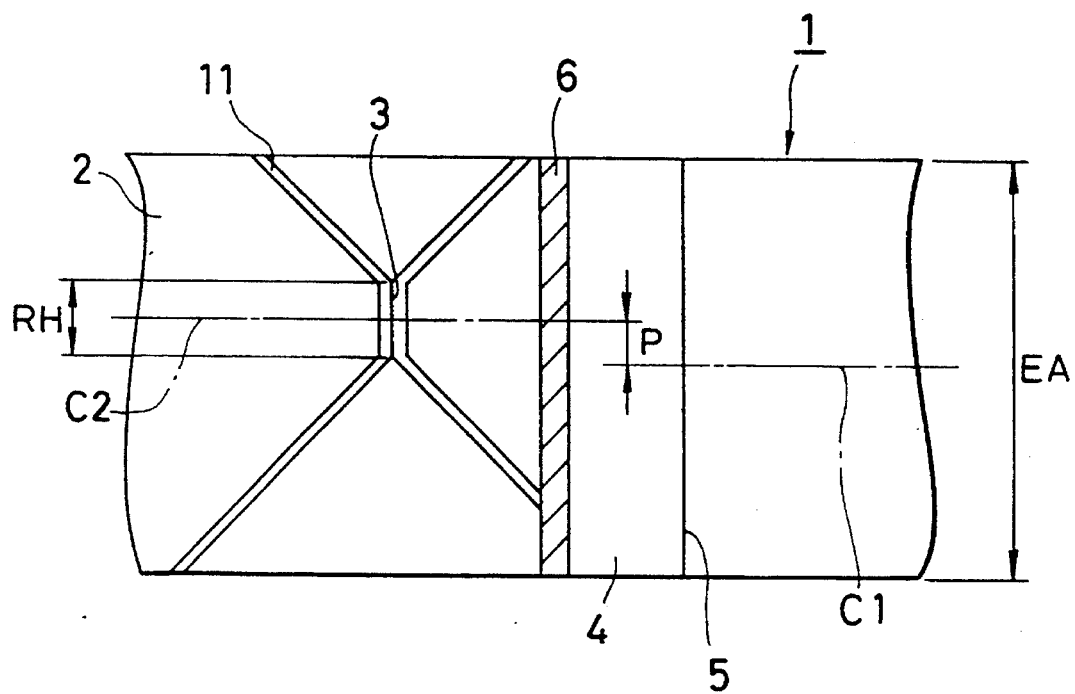
FIG. 7 is an enlarged detail of a gap part in a magnetic core of the magnetic head shown in FIG. 6.
Figure 8:
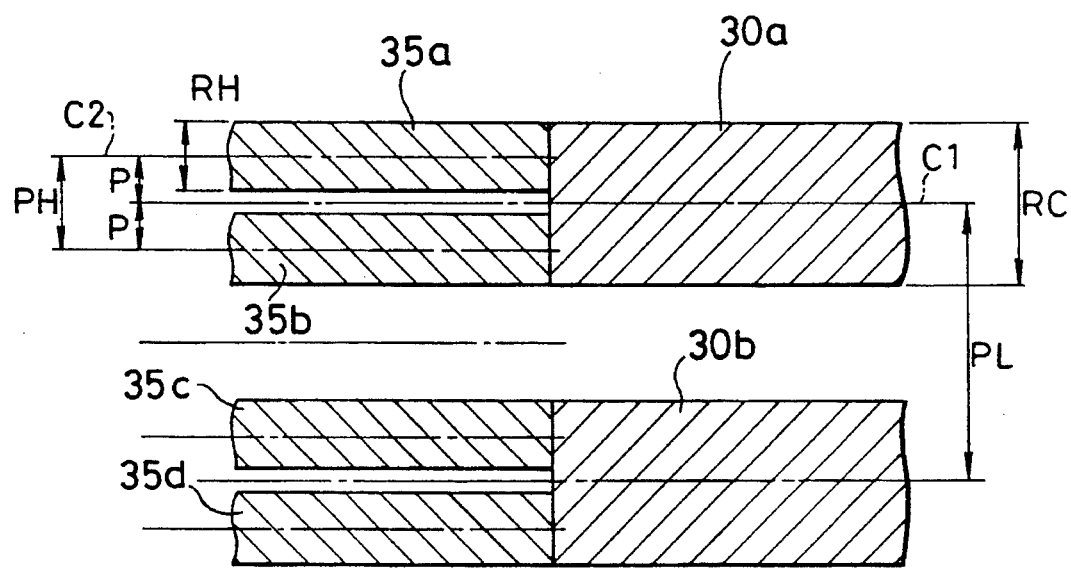
FIG. 8 is an explanatory view showing a recording technique in the case where recording is made on a low-ranking medium by the magnetic head shown in FIGS. 6 and 7.

FIGS. 6–8 are views for explaining a first embodiment of a magnetic head for an FDD according to the present invention. In these figures, components and parts common to or corresponding to those illustrated in FIGS. 1–3B and 5 are designated by the same or like reference numerals.

FIG. 6 is a view showing a front surface of the magnetic head whose medium-sliding surface 9 is located. As shown in FIG. 6, an erasing core 4 having a single erasing gap 5, and a recording/reproducing core 2 having a single recording/reproducing gap 3 are joined each other though a gap plate 6, to make up core assembly 1. A pair of sliders 7 and 8 are joined to each side of the core assembly 1, respectively, to a magnetic head 10. The erasing gap 5 and the recording/reproducing gap 3 are disposed in such a manner that they are adjacent to each other longitudinally along the medium-sliding direction indicated by the arrow A shown in FIG. 6. The erasing gap 5 serving as a precedingly erasing type is arranged upstream of the recording/reproducing gap 3 in the medium-sliding direction. Such arrangement is apparently, substantially similar to that of the conventional example shown in FIGS. 2A and 2B. However, the arrangement of the embodiment is different from the conventional example above in a construction of a gap portion in the core assembly 1. A major portion of the gap in FIG. 6 is shown in enlargement in FIG. 7.

In FIG. 7, the erasing gap 5 in the erasing core 4 has an erasing track width EA corresponding to the low-ranking track density. For example, assuming that the low-ranking track density is 135 TPI, the erasing track width EA is set at a value on the order of 0.24–0.26 mm. In confronting surfaces of the recording/reproducing core 2 which are confronted each other though the recording/reproducing gap 3, a thin film 11 of soft magnetic material with high permeability is made up at a thickness of a few micrometers to several tens of micrometers by a thin-film forming technology such as vacuum-deposition, sputtering or the like. The recording/reproducing gap 3 in the recording/reproducing core 2 has a recording/reproducing track width RH corresponding to the high-ranking track density. For example, assuming that the high-ranking track density is 405 TPI, the recording/reproducing track width RH is set at a value on the order of 0.05 mm.

As a particularly novel construction of the present embodiment, a center (referred to as "a track center" hereinafter) C2 of the recording/reproducing gap 3 is shifted by a predetermined amount P in the direction perpendicular to the track, with respect to a track center C1 of the erasing gap 5 in the direction perpendicular to the track. Here, this amount of shift P is ½ of a high-ranking track pitch PH as shown in FIG. 8, which will be described later. In this connection, in the case where crosstalk between the recording/reproducing core 2 and the erasing core 4 is so small that no problem arises practically, the gap plate 6 may be removed so that the two front cores of the cores 2 and 4, sandwiching the gap plate 6, may be integrated into one common core.

In the magnetic head 10 constructed as described above, a servo signal is read by the recording/reproducing gap 3 in the recording/reproducing core 2 with respect to a high-ranking (405 TPI) floppy disc, to execute track positioning control, and to execute recording/reproducing of information. Further, in the case where reproducing is executed with respect to a low-ranking (135 TPI) floppy disc, reproducing is possible at the high-ranking track width RH narrower than the low-ranking track width. In this case, positioning of the track is easy, and since the track density of the floppy disc of 405 TPI is three times as many as the track density of the floppy disc of 135 TPI, the track feeding made every three tracks by the high-ranking track feeding system, corresponds to the low-ranking track positioning.

Next, recording executed with respect to the low-ranking floppy disc will be described with reference to FIG. 8. Data 30a and 30b, which are recorded at the low-ranking track density, are recorded at the track pitch PL, and at the track width RC, which is equal to the width of the recording/reproducing core 2 which is equal to the width of the conventional example shown in FIGS. 2A and 2B. In order to rewrite the data 30a and 30b by means of the magnetic head 10 according to the present embodiment, the track center C1 of the erasing gap 5 is first aligned with the track center C1 of the recorded data 30a. Second, the recorded data 30a are erased by the erasing gap 5, and then, rewritten new data 35a are recorded by the recording/reproducing gap 3 corresponding to the high-ranking track density. Since the track center C2 of the recording/reproducing gap 3 is shifted from the track center C1 by the amount of shift P, the data 35a are recorded on an area which is slightly narrower than an upper half of the track width RC in FIG. 8.

Next, the magnetic head 10 is moved by the high-ranking track pitch PH in a downward direction in FIG. 8, so as to record the data 35b identical with the data 35a. The data 35b are recorded on an area which is slightly narrower than a low half of the track width RC in FIG. 8. In this manner, in the present embodiment, when recording (rewriting) is executed with respect to the low-ranking floppy disc, the same data are recorded twice, that is the same data are recorded every two tracks at the high-ranking track pitch.

If the rewriting is made only to a single track at the track width RH without rewriting the same data twice in a manner described above, an output is reduced in proportion to the reduction of the track width when the data are reproduced by the low-ranking head, since the track width RH is unduly narrow; and Thus, there arise problems such as reduction in margin, occurrence of errors, and the like. Generally speaking, reduction in the track width due to off-rack or the like in the low-ranking FDD cannot prevent error occurrence when the reduction exceeds about 50%. For example, assuming that the recording/reproducing track width RC of 135 TPI is 0.115 mm, the rewriting track width required is 0.057 mm or more. On the other hand, since the high-ranking recording/reproducing track width corresponding to 405 TPI or more is 0.05 mm or less, the above-described problems arise in rewriting only a single track.

On the contrary, in the case of the present embodiment, although, non-recording area is left as a guard band between the same rewritten data 35a and 35b, a width of the non-recording area is equal to or less than 10% of the low-ranking recording/reproducing track width RC, and the sum of the track widths of the data 35a and 35b is equal to or more than 90% of the track width RC. Accordingly, output reduction is slight in reproducing by the low-ranking magnetic head, and no problem arises.

In connection with the above, because of the amount of shift P between the above-described track centers C1 and C2, control of the track positioning can be easily executed when rewriting every two tracks is executed as shown in FIG. 8. More specifically, it is sufficient that, as described previously, the track position of the erasing core 4 in the head is aligned with the low-ranking track position to execute erasing and first recording, and subsequently, the head is moved by the high-ranking track pitch to execute second recording.

In contrast with this, when the amount of shift P is not provided, although it is not impossible to execute recording as shown in FIG. 8, positioning control of the head becomes very complicated and difficult. This is not practical: in this case, erasing is first executed in agreement with the low-ranking track position, and subsequently, the head is moved only by the amount of shift P upward in the figure to execute first recording. Subsequently, the head is moved only by twice the amount of shift P downward to execute second recording. As a result, moving of the high-ranking track pitch is not executed, and the feeding pitch falls into two types. Thus, irregular and complicated control must be executed.

As described above, according to the magnetic head of the present embodiment, the above-described shift in the track center enables the recording shown in FIG. 8 to be executed easily, so that recording and reproducing are possible corresponding to the different track densities. Furthermore, the construction of the magnetic head according to the present embodiment is simple because its core assembly 1 is single, and its construction is not so much different from that of the conventional example shown in FIGS. 2A and 2B. Thus, the design of the magnetic head according to the embodiment is easy because there is no problem such as the coil space as in the conventional example shown in FIG. 5. In addition, the number of components does not increase, and the magnetic head can be made at a low price. Further, since the core assembly is single, there is no problem such as crosstalk between two core assemblies, and the sliding contact of the gap part with respect to the medium is stable. Thus, there is no deterioration in recording/reproducing characteristics, contrary to the conventional example shown in FIG. 5.

(Second Embodiment)

Figure 9:
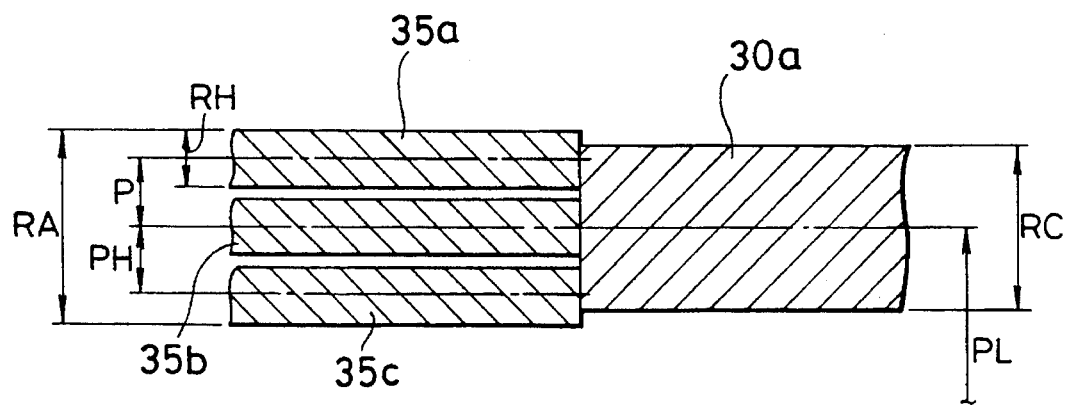
FIG. 9 is an explanatory view showing a recording technique in the case where recording is made on a low-ranking medium by a magnetic head of another embodiment in accordance with the present invention.

In the construction of the above-described first embodiment, the amount of shift P between the track center C1 of the erasing core 4 corresponding to the low-ranking track density and the track center C2 of the recording/reproducing core 2 corresponding to the high-ranking track density must increase consistently with the high-ranking track density. More specifically, as shown in FIG. 9 as another embodiment of the invention, if the high-ranking track density is increased further than that shown in FIG. 8 as compared with the track width RC of the low-ranking recorded data 30a, the track pitch PH becomes narrower, and the width RH of the data 35 of the recording/reproducing core 2 becomes also narrower. Accordingly, in the case where the low-ranking recorded data 30a are rewritten, it is necessary to record the same data on three or more tracks.

Here, the relationship between the number of rewritten tracks and the rewritten range RA of the track in accordance with the track density of the high ranking models against the 135 TPI (track pitch =187.5 μm) which is used in common floppy discs of 1–4 MB, is listed in the table illustrated in FIG. 10. In FIG. 10, ranges enclosed by thick lines are ranges capable of rewriting by the high-ranking track density, in which the high-ranking rewriting range RA is equal to or more than 50% of the track width RC of the low-ranking recorded data 30a, and is less than 0.1875 mm, the low-ranking track pitch. Since the rewriting range RA falls in a value close to the track width RC of the recorded data 30a within the ranges capable of rewriting, in the case where the high ranking model is 405 TPI, it is required to execute recording on two tracks in the high-ranking rewriting range RA=PH (high-ranking track pitch)+RH (high-ranking R/W track width). In the case where the high ranking model is 677 TPI, recording of three tracks is required, as RA=2×PH+RH as shown in FIG. 9. Hereunder, as the high-ranking track density increases, a number of rewriting tracks increases such that the number of rewriting tracks is four tracks as 3×PH+RH, five tracks as 4×PH+RH, six tracks as 5×PH+RH, and seven tracks as 6×PH+RH.

The amount of shift P in the magnetic head increases by 0.5 PH as the number of rewriting tracks increases by one, such as PH/2 at RA=PH+RH, PH at RA=2PH+RH, and 1.5 PH at RA=3 PH+RH.

In connection with the above, FIG. 10 shows the case where the high-ranking track density is an integer multiple of the low-ranking truck density. However, it is needless to say that the high-ranking truck density is not an integer multiple of the low-ranking truck density.

The invention has been described in detail with respect to preferred embodiments, and it will now be apparent from the foregoing to those skilled in the art that changes and modifications may be made departing from the intention in its broader aspects, and it is the intention, therefore, in the appended claims to cover all such changes and modifications as fall within the true spirit of the invention.

What is claimed is:

1. A magnetic head for sliding on a recording medium for executing magnetic recording or magnetic reproducing of information, said magnetic head comprising:

a magnetic core having a recording/reproducing magnetic gap whose track width is defined narrow in accordance with high-ranking high track density, and an erasing magnetic gap which is disposed upstream of a medium-sliding direction, in such a manner that said erasing magnetic gap is adjacent to said recording/reproducing gap, and whose track width is defined wide in accordance with low-ranking low track density, wherein a center of said recording/reproducing magnetic gap in a direction perpendicular to the track is shifted by a predetermined amount of shift in the direction perpendicular to the track with respect to a center of said erasing magnetic gap in the direction perpendicular to the track.

2. A magnetic head as claimed in claim 1, wherein said predetermined amount of shift is set at a value N/2, where N is an integer equal to or greater than 1, times a track pitch of said high track density, and said value N increases as a value of said high track density increases.

3. A method of recording identical data on a plurality of tracks at said high track density on a magnetic recording medium previously recorded at said low track density so as to execute rewriting of said data comprising utilizing the magnetic head as claimed in claim 1.

4. A method of recording utilizing a magnetic head as claimed in claim 3, wherein said magnetic core comprises a recording/reproducing core having said recording/reproducing magnetic gap and an erasing core having said erasing magnetic gap, and wherein rewriting of said data is executed by aligning a track position of said erasing core with a track position of said low track density, and by executing erasing and first recording, and subsequently, moving said magnetic head a predetermined value in the direction perpendicular to the track corresponding to a track pitch of said high track density to execute a second and subsequent recordings.

5. A method of recording utilizing a magnetic head as claimed in claim 3, wherein a rewriting range RA at said high track density follows the following equation with N, where N is an integer equal to or greater than 1, with respect to a track pitch PH of said high track density and a read/write track width RH of said high track density:

$$RA = N \times PH + RH$$

wherein rewriting is executed N+1 times in accordance with said high track density resulting in N+1 tracks at said high density, and wherein said predetermined amount of shift increases by 0.5 PH as the number of tracks for rewriting increases by 1.

6. A magnetic head as claimed in claim 1, wherein said recording/reproducing magnetic gap has a recording/reproducing track width corresponding to said high track density, and said erasing magnetic gap has an erasing track width corresponding to said low track density.

7. A magnetic head as claimed in claim 6, wherein said recording reproducing track width is approximately 0.05 mm, assuming that said high track density is 405 tracks per an inch, and said erasing track width is approximately 0.24 mm to 0.26 mm, assuming that said low track density is 135 tracks per an inch.

8. A magnetic head as claimed in claim 1, wherein said magnetic core includes an erasing core having said erasing magnetic gap and a recording/reproducing core having said recording/reproducing magnetic gap interconnected through a plate-like element for preventing magnetic interference.

9. A magnetic head as claimed in claim 8, wherein said recording/reproducing core has confronting surfaces which confront each other through said recording/reproducing magnetic gap, and wherein said confronting surfaces are covered with a thin film of soft magnetic material with high permeability.

10. A magnetic head for sliding on a rotating magnetic disc for executing magnetic recording of information and/or magnetic reproducing of information, said magnetic head comprising:

a single core assembly having an upstream erasing gap and a downstream recording/reproducing gap which are arranged adjacent to each other along a disc-rotating direction; and a pair of sliders joined to both sides of said single core assembly respectively, wherein said upstream erasing gap has a track width corresponding to low-ranking low track density, and said downstream recording/reproducing gap has a track width corresponding to high-ranking high track density, and wherein said downstream recording/reproducing gap has a center in a direction perpendicular to the track, which is so set as to be shifted by a predetermined amount in the direction perpendicular to the track with respect to a center of said upstream erasing gap in the direction perpendicular to the track, said predetermined amount being set at integer valued multiples of ½ of a track pitch of said high track density.

* * * * *